United States Patent [19]
Shiroshita et al.

[11] Patent Number: 5,892,894
[45] Date of Patent: Apr. 6, 1999

[54] DATA RE-TRANSMISSION MANAGEMENT SCHEME WITH IMPROVED COMMUNICATION EFFICIENCY

[75] Inventors: Teruji Shiroshita, Kanagawaken; Osamu Takahashi, Tokyo; Masahide Yamashita, Kanagawaken, all of Japan

[73] Assignee: Nippon Telegraph & Telephone Corp., Tokyo, Japan

[21] Appl. No.: 760,940

[22] Filed: Dec. 6, 1996

[30] Foreign Application Priority Data

Dec. 8, 1995 [JP] Japan .................................. 7-320904

[51] Int. Cl.$^6$ .................................................. G06F 11/14
[52] U.S. Cl. ............................. 395/182.02; 395/182.16; 371/32
[58] Field of Search ..................... 395/182.02, 182.13, 395/182.16, 185.08; 371/33, 32; 364/265.1

[56] References Cited

U.S. PATENT DOCUMENTS

| | | | |
|---|---|---|---|
| 4,860,292 | 8/1989 | Newman et al. | 371/32 |
| 5,084,877 | 1/1992 | Netravali et al. | 371/32 |
| 5,297,143 | 3/1994 | Fridrich et al. | 371/32 |
| 5,388,216 | 2/1995 | Oh | 395/275 |
| 5,414,717 | 5/1995 | Matsumoto et al. | 371/32 |
| 5,467,079 | 11/1995 | Hasegawa | 340/825.16 |
| 5,490,153 | 2/1996 | Gregg et al. | 371/32 |
| 5,553,083 | 9/1996 | Miller | 371/32 |
| 5,613,065 | 3/1997 | Ishibashi et al. | 395/185.01 |
| 5,664,091 | 9/1997 | Keen | 395/182.16 |

OTHER PUBLICATIONS

Article from *Sigmetrics*, Santa Clara, California, dated May 1994, entitled, "A Comparison of Sender–Initiated and Receiver–Initiated Reliable Multicast Protocols", by Sridhar Pingali, pp. 221–230.

Abstract of "Exploiting Group Communication for Reliable High Volume Data Distribution", by Jeremy R. Cooperstock and Steve Kotsopoulos, pp. 1–4.

*Primary Examiner*—Robert W. Beausoliel, Jr.
*Assistant Examiner*—Scott T. Baderman
*Attorney, Agent, or Firm*—Banner & Witcoff Ltd

[57] ABSTRACT

A data re-transmission management scheme capable of improving the communication efficiency. In a data re-transmission from a server to a plurality of terminals through a communication network, any abnormal terminal including a busy terminal and/or a poor performance terminal among the plurality of terminals is detected, and each abnormal terminal is managed separately from other normal terminals, at the server. A management of data transmission and re-transmission from the server to the normal terminals is carried out first, and then a management of a re-transmission of only unreceived data of each abnormal terminal from the server to each abnormal terminal is carried out, after a completion of the data transmission and re-transmission with respect to the normal terminals.

18 Claims, 13 Drawing Sheets

FIG. 6

|  | 1 | 2 | 3 | 4 | ...... |  |  | m |
|---|---|---|---|---|---|---|---|---|
| 1 | × | ○ | ○ | ○ |  |  |  | ○ |
| 2 | ○ | ○ | ○ | × |  |  |  | ○ |
| 3 | × | ○ | ○ | × | ...... |  |  | × |
| ⋮ |  |  |  | ⋮ |  |  |  |  |
| n | ○ | ○ | ○ | ○ |  |  |  | ○ |

PACKET NUMBER → 1041

TERMINAL ID ↓

○ : RECEIVED
× : UNRECEIVED

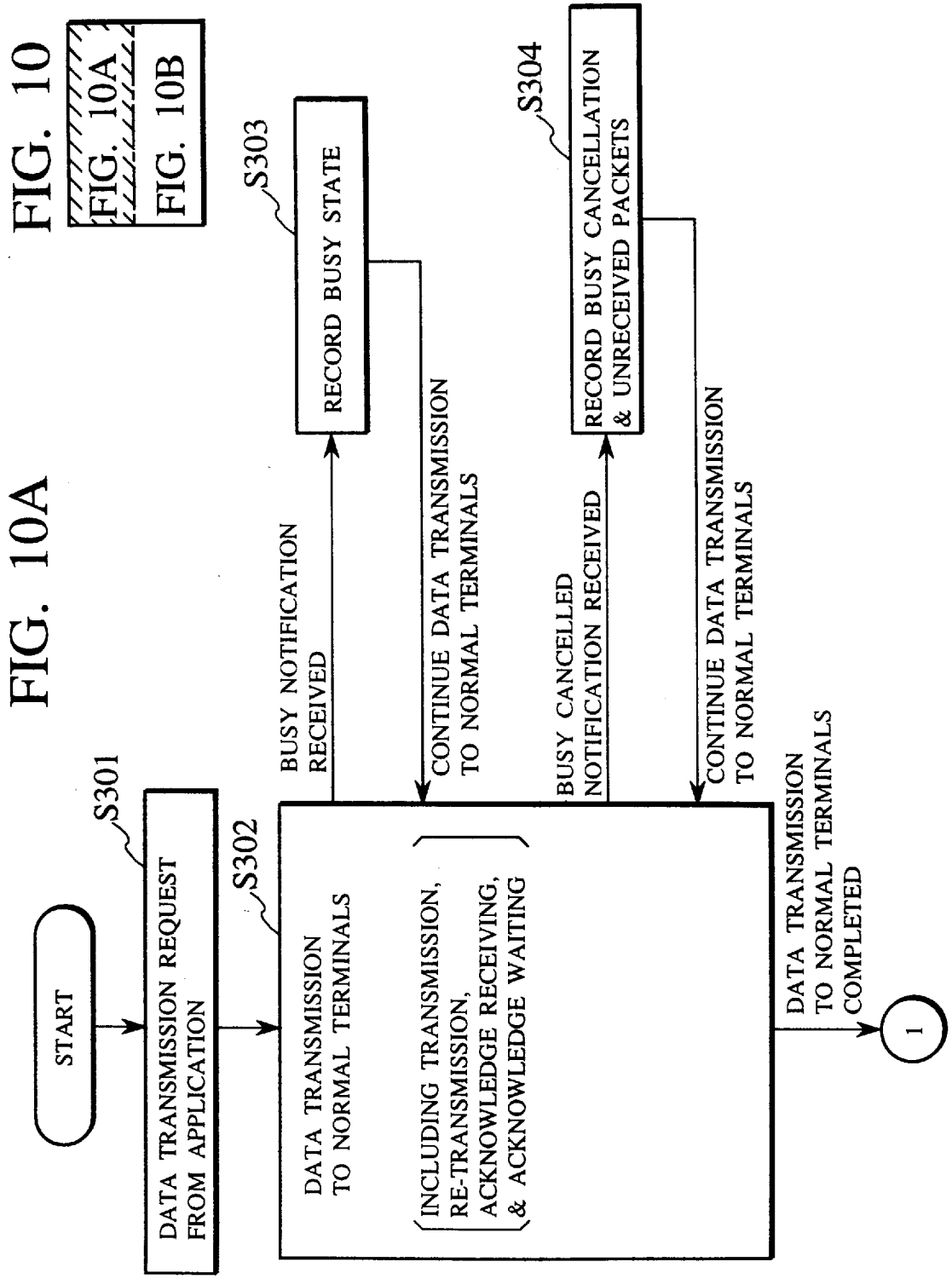

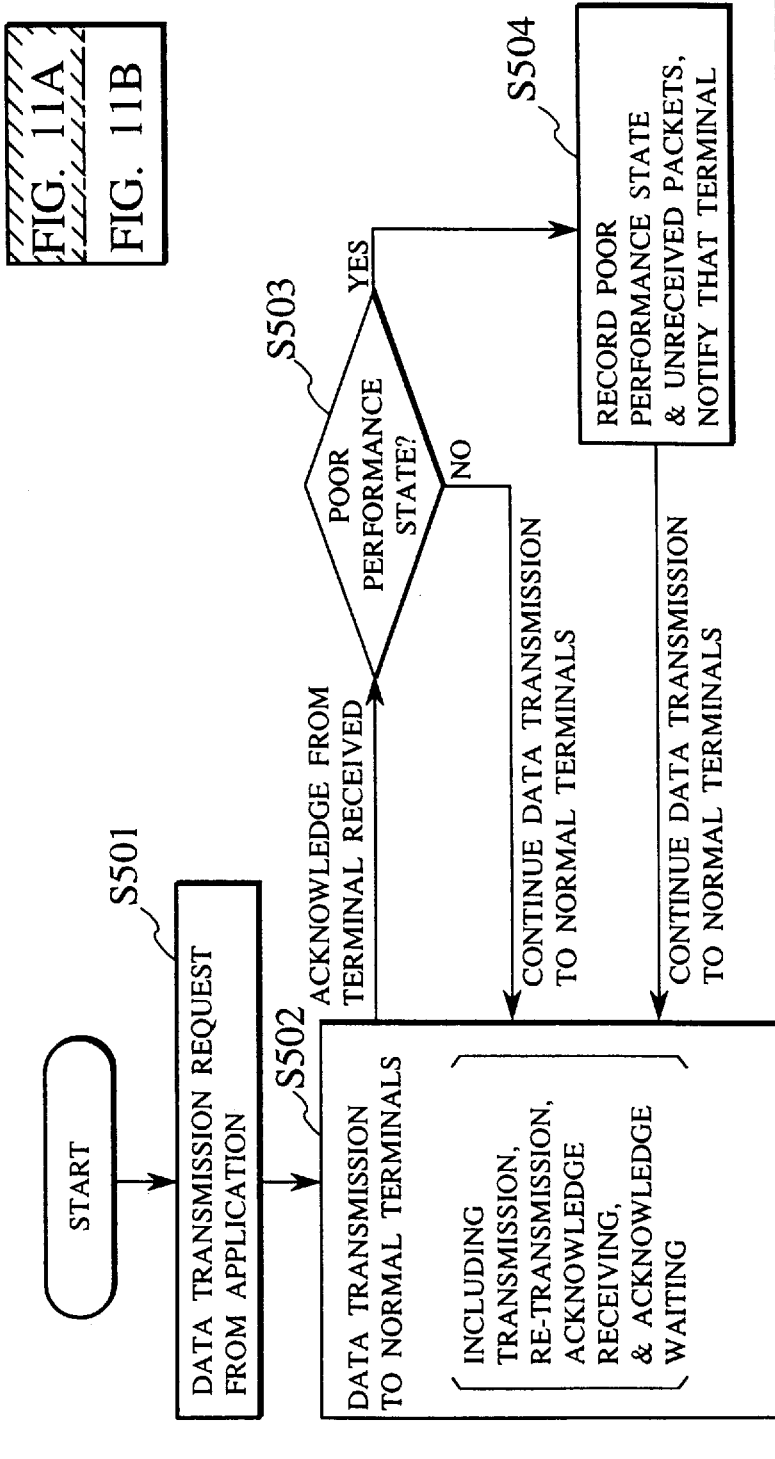

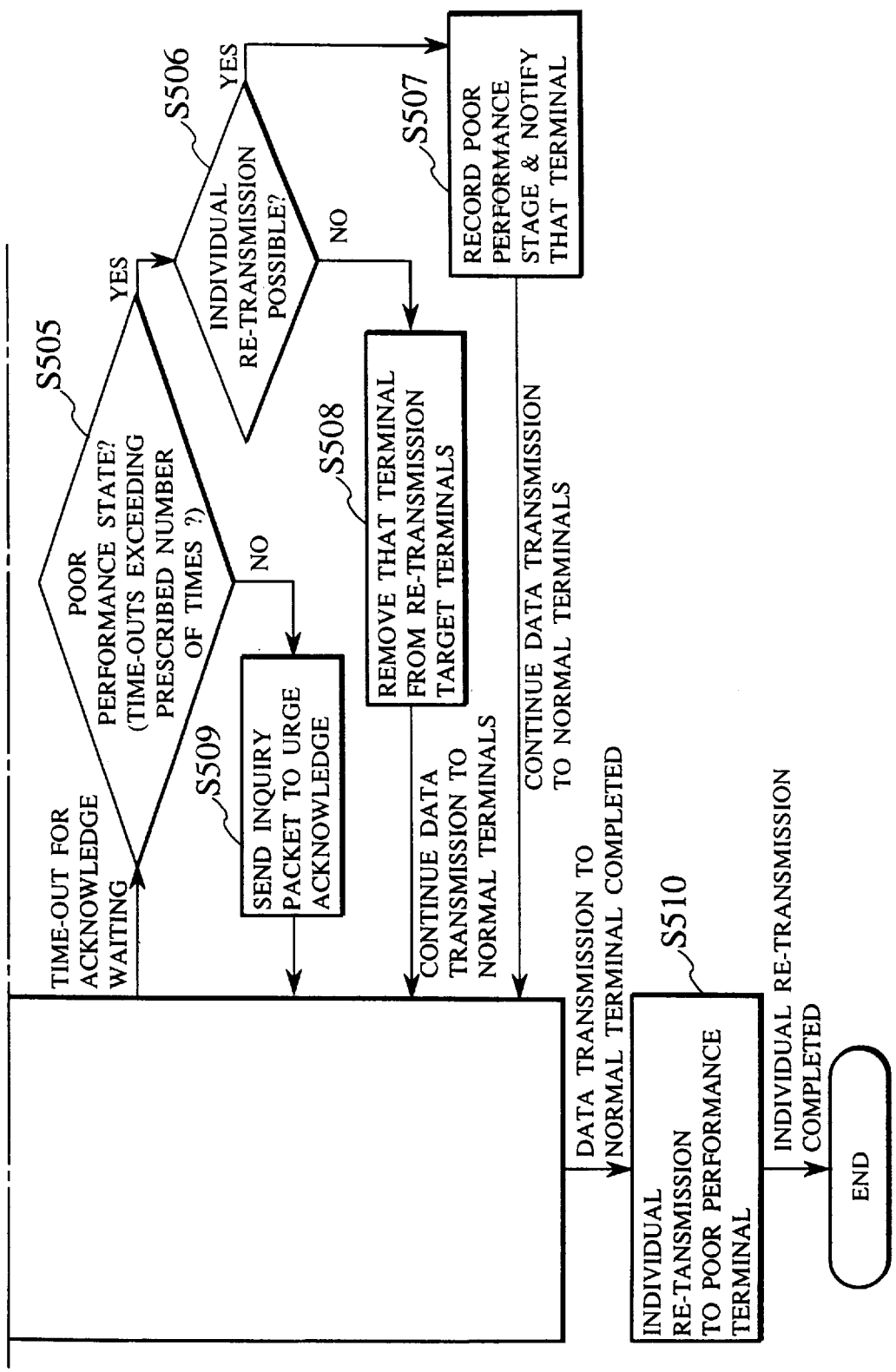

DATA RE-TRANSMISSION MANAGEMENT SCHEME WITH IMPROVED COMMUNICATION EFFICIENCY

BACKGROUND OF THE INVENTION

1. Field of the Invention

The present invention relates to a data re-transmission management scheme in which a server carries out a data transmission with respect to a plurality of terminals such as a multicast communication, and a data re-transmission with respect to terminals in a case of a loss or error of the received data at terminals.

2. Description of the Background Art

In general, in a multicast communication in which a server transmits data with respect to a plurality of terminals, the server of the transmitting side divides a series of data into data of appropriate sizes (called packets) and transmits the packets to the terminals. Each terminal then returns a positive acknowledge (ACK) for a normal receiving or a negative acknowledge (NACK) indicating information on unreceived data to the server, and the server carries out the data re-transmission with respect to a plurality of terminals again according to the returned acknowledges.

FIG. 1 shows a procedure of the data re-transmission to a plurality of terminals according to a conventional management scheme. In this conventional procedure of FIG. 1, the server transmits all the transmission data with respect to a plurality of terminals first. Then, each terminal returns an acknowledge (ACK/NACK) to the server, and the server generates the re-transmission data according to the returned acknowledges and carries out the data re-transmission. This operation is repeated subsequently.

FIG. 1 shows an exemplary case of the data transmission from the server 1100 to three terminals 13001, 1300-2 and 1300-3. In response, the acknowledge for a normal receiving (ACK) or for a abnormal receiving (NACK) is returned from each terminal. In this example, only the terminal 1300-1 returned ACK as a result of this data transmission, so that the server 1100 generates the re-transmission data and carries out the data re-transmission with respect to the terminals 1300-2 and 1300-3 next. In this example, only the terminal 1300-2 returned ACK as a result of this data re-transmission, so that the server 1100 generates the re-transmission data and carries out the data re-transmission with respect to the terminal 1300-3 again.

On the other hand, in a case of the one-to-one communication, there is a conventional data transmission management scheme in which a terminal transmits a busy notification to the server when this terminal becomes temporarily busy, so as to request the interruption of the data transmission to this busy terminal, and this terminal transmits a busy cancelled notification to the server when this terminal becomes free.

FIG. 2 shows a procedure of this conventional data transmission management scheme using a busy notification in the one-to-one communication. In this conventional procedure of FIG. 2, when a busy notification from a terminal which became temporarily busy is received by the server during the data transmission, the server interrupts the data transmission to this terminal, and the server resumes the data transmission after a busy cancelled notification is received from this terminal.

FIG. 2 shows an exemplary case in which the server 1100 transmits data to the terminal 1300 while the terminal 1300 is temporarily busy. In this case, when the server 1100 transmits data, the busy notification is issued from the terminal 1300, so that the server 1100 interrupts the data transmission upon receiving this busy notification. Then, when the terminal 1300 becomes free, the terminal 1300 transmits the busy cancelled notification to the server 1100. Upon receiving this busy cancelled notification, it becomes possible for the server 1100 to resume the data transmission to the terminal 1300.

However, when these two conventional management schemes described above are used in combination, there arises a problem in that, when the server receives the busy notification from one terminal, if the server is carrying out a unified state management for this one terminal and for the other normal terminals, the data transmission or re-transmission with respect to the other normal terminals which are not busy would also be interrupted when the data transmission or re-transmission with respect to that one terminal is interrupted in response to the busy notification, so that the efficiency of the entire data communication would be lowered considerably. On the other hand, under the same circumstance, if the communication with respect to that one terminal is taken out from the state management, there would be a need to carry out the re-transmission with respect to that one terminal from the beginning, including even those data which were already received, so that the communication efficiency with respect to that one terminal would be lowered considerably.

In addition, in the former one of the two conventional management schemes described above, if a certain terminal with a poor data receiving state is treated equally as all the other normal terminals, there is a problem in that, because of the poor receiving performance of this certain terminal, the data communication efficiency with respect to all the terminals would be lowered by the need of the acknowledge processing or the acknowledge waiting for this certain terminal. On the other hand, under the same circumstance, if the communication with respect to that certain terminal is taken out from the state management, there would be a need to carry out the re-transmission with respect to that certain terminal from the beginning, including even those data which were already received, so that the communication efficiency with respect to that certain terminal would be lowered considerably.

Note that the problems described above are prominent in a case of the data transmission using the multicast communication in which the server transmits data with respect to a plurality of terminals by a single transmission processing.

SUMMARY OF THE INVENTION

It is therefore an object of the present invention to provide a data re-transmission management scheme capable of improving the communication efficiency, by carrying out the data transmission and re-transmission with respect to normal terminals first, and carrying out the data transmission and re-transmission with respect to a busy cancelled terminal or a terminal with a poor receiving performance only after the data transmission and re-transmission with respect to the normal terminals.

It is another object of the present invention to provide a data re-transmission management scheme capable of improving the communication efficiency, by re-transmitting only the unreceived data with respect to a busy cancelled terminal or a terminal with a poor receiving performance without re-transmitting the already received data, so as to reduce an amount of re-transmission data.

According to one aspect of the present invention there is provided a method for a management of data re-transmission from a server to a plurality of terminals through a communication network, comprising the steps of: (a) detecting any abnormal terminal including a busy terminal and/or a poor performance terminal among the plurality of terminals, and managing each abnormal terminal separately from other normal terminals, at the server; (b) carrying out a management of data transmission and re-transmission from the server to the normal terminals; and (c) carrying out a management of a re-transmission of only unreceived data of each abnormal terminal from the server to each abnormal terminal, after a completion of the data transmission and re-transmission with respect to the normal terminals by the step (b).

According to another aspect of the present invention there is provided a server for carrying out a management of a data re-transmission to a plurality of terminals through a communication network, comprising: management means for detecting any abnormal terminal including a busy terminal and/or a poor performance terminal among the plurality of terminals, and managing each abnormal terminal separately from other normal terminals; and transmission means for carrying out data transmission and re-transmission to the normal terminals, and a re-transmission of only unreceived data of each abnormal terminal to each abnormal terminal under a control of the management means, after a completion of the data transmission and re-transmission with respect to the normal terminals.

Other features and advantages of the present invention will become apparent from the following description taken in conjunction with the accompanying drawings.

BRIEF DESCRIPTION OF THE DRAWINGS

FIG. 6 is a diagram showing a re-transmission management table used in the server of FIG. 5 for one embodiment of the present invention.

FIG. 10 consisting of FIG. 10A

FIG. 11 consisting of FIG. 11A and FIG. 11B is a flow chart for a processing of the server in a case of handling a poor performance terminal in one embodiment of the present invention.

DETAILED DESCRIPTION OF THE PREFERRED EMBODIMENTS

Referring now to FIG. 3 to FIG. 11, one embodiment of a data re-transmission management scheme according to the present invention will be described in detail.

Figure 1:
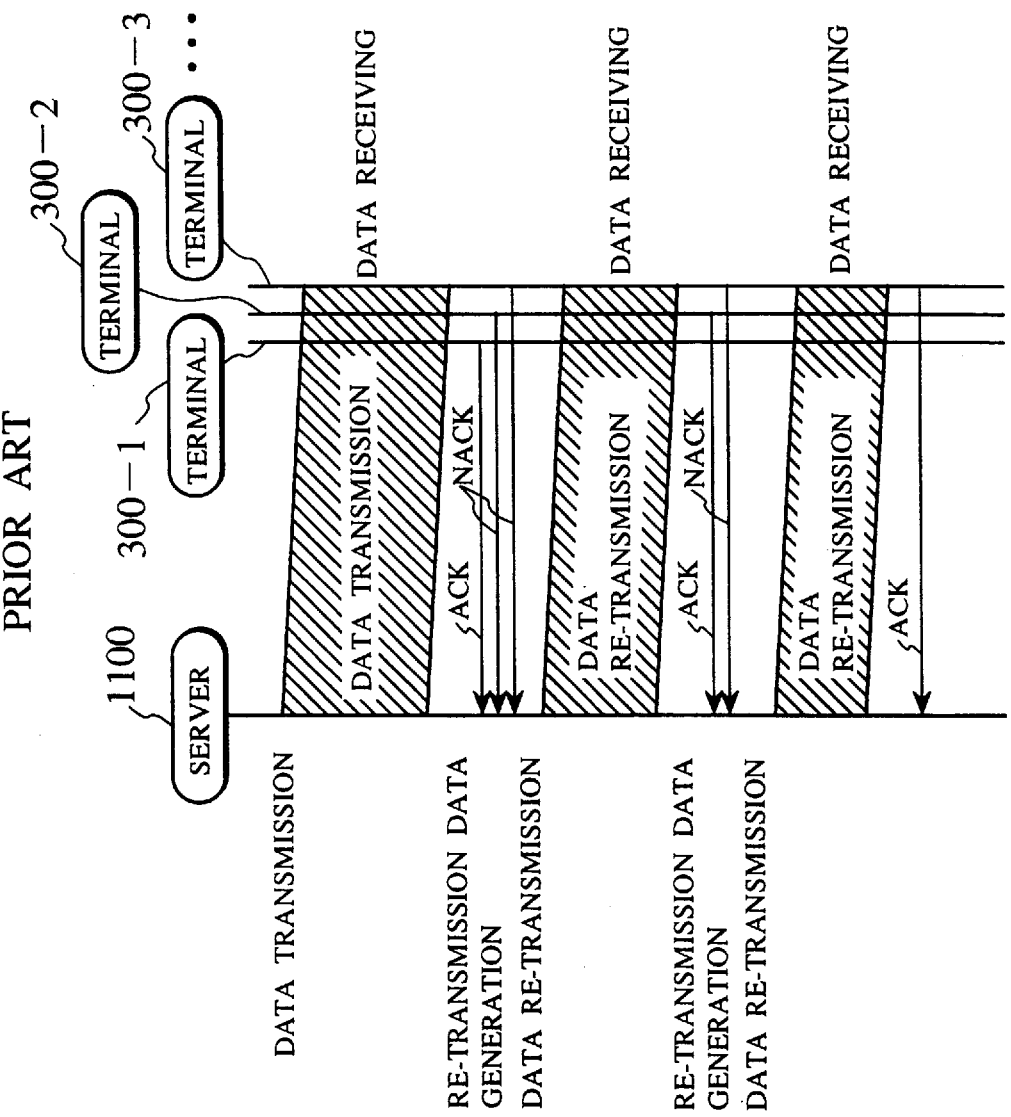
FIG. 1 is a sequence diagram showing a conventional data re-transmission procedure.
Figure 2:
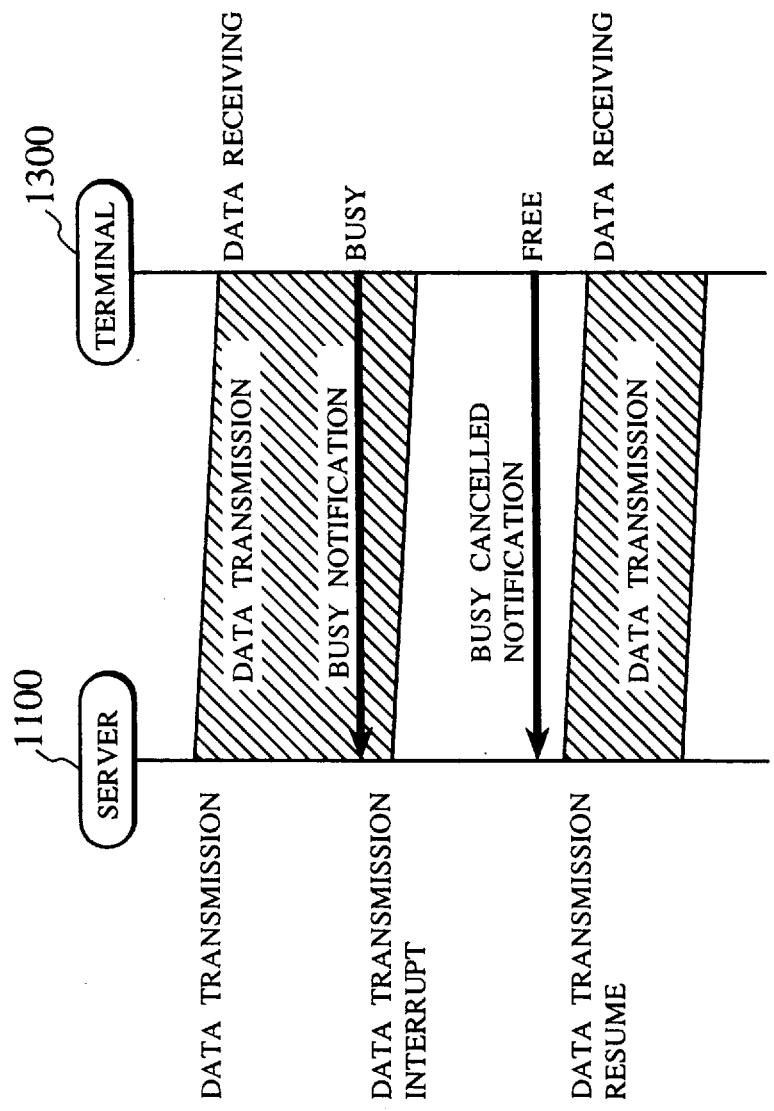
FIG. 2 is a sequence diagram showing a conventional data transmission procedure using a busy notification.
Figure 3:
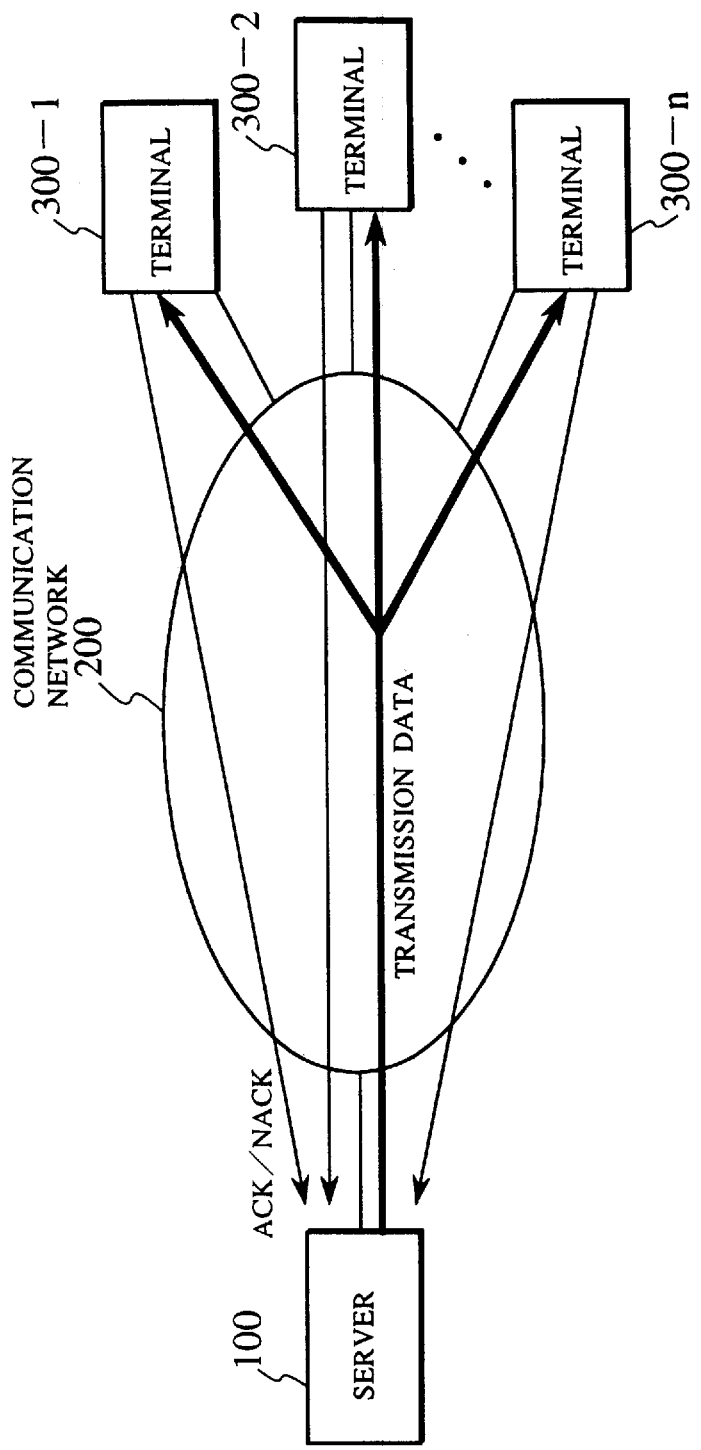
FIG. 3 is a block diagram of an information communication system in one embodiment of the present invention.

FIG. 3 shows a configuration of an information communication system in this embodiment, which comprises a server 100, a plurality of terminals 300 (300-1 to 300-n), and a communication network connecting the server 100 and the terminals 300.

In this information communication system of FIG. 3, the server 100 transmits data to a plurality of terminals 300, and in response each terminal 300 returns a positive acknowledge indicating a receiving confirmation or a negative acknowledge indicating re-transmission information.

Figure 4:
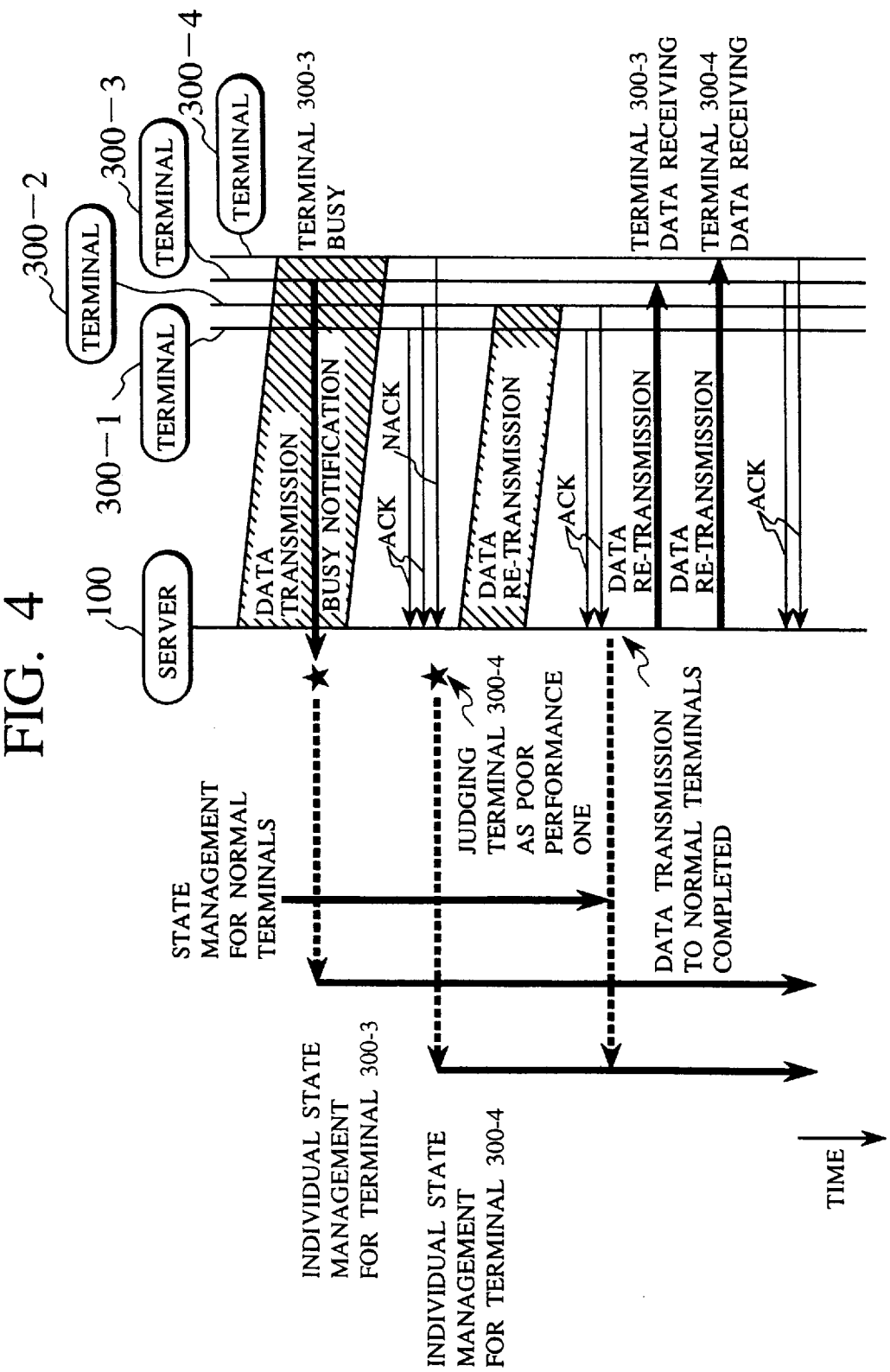
FIG. 4 is a sequence diagram showing a data re-transmission procedure in one embodiment of the present invention.

FIG. 4 shows an outline of the data re-transmission procedure in the information communication system of FIG. 3, in which the state management of an individual terminal arises from the state management of normal terminals. FIG. 4 shows an exemplary case in which the server 100 carries out the data transmission with respect to four terminals 300-1, 300-2, 300-3 and 300-4.

In this embodiment, the individual state management of a terminal 300 is started by a specific event at the server 100. The server 100 carries out the individual state management for one or more terminals in parallel to the state management of the normal terminals.

For example, in FIG. 4, when the server 100 receives a busy notification from a terminal 300-3, the individual state management for this terminal 300-3 as a busy terminal is started. Also, when the server 100 judges a terminal 300-4 as a poor performance terminal, the individual state management for this terminal 300-4 as a poor performance terminal is started. In either case, the state management of the other normal terminals 300-1 and 300-2 is continued.

In FIG. 4, in response to the data transmission by the server 100 with respect to the terminals 300-1, 300-2, 3003 and 300-4, the positive acknowledges (ACK) are received from the terminals 300-1 and 300-2, while a busy notification is received from the terminal 300-3. At this point, the individual state management for the terminal 300-3 as a busy terminal is started. In addition, a negative acknowledge (NACK) indicating a poor receiving state is received from the terminal 300-4 (or the time-out is repeated for over a prescribed number of times while not receiving any acknowledge from this terminal), so that this terminal 300-4 is judged as a poor performance terminal and the individual state management for the terminal 300-4 as a poor performance terminal is started.

Figure 5:
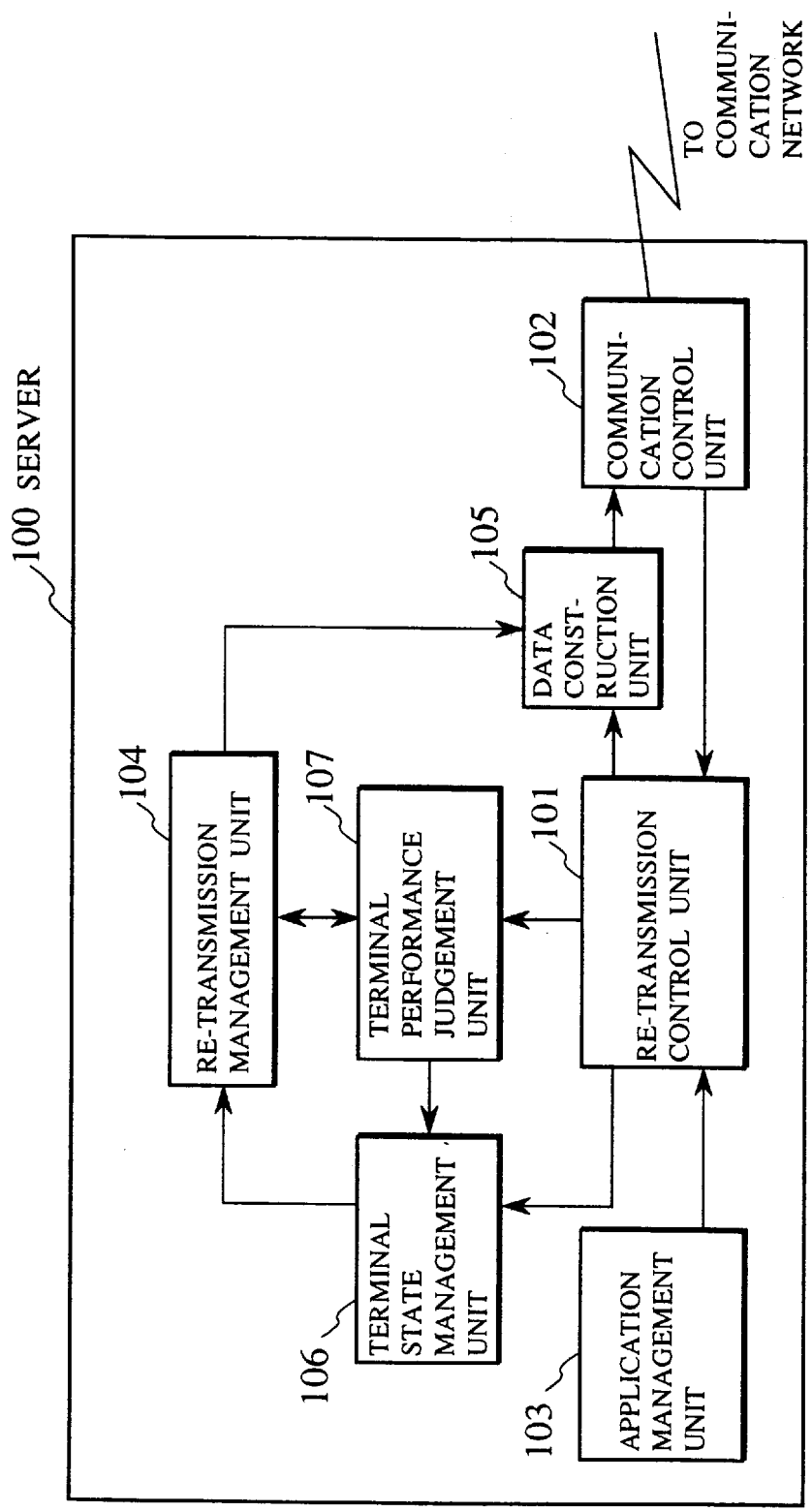
FIG. 5 is a block diagram of a server in the information communication system of FIG. 3 for one embodiment of the present invention.
Figure 7:
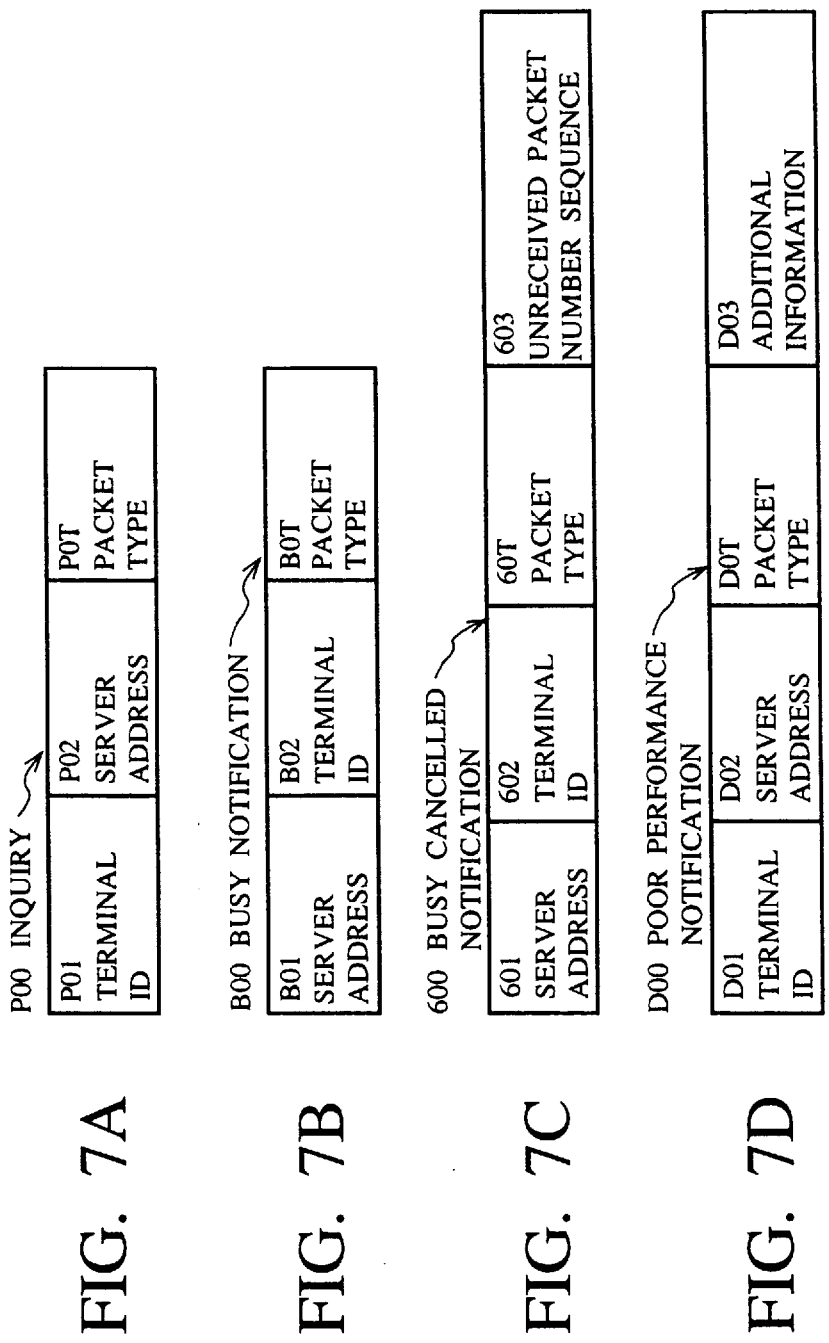
FIGS. 7A, 7B, 7C and 7D are diagram showing various communication frames used in the information communication system of FIG. 3 for one embodiment of the present invention.

FIG. 5 shows a configuration of the server 100 in this embodiment, This server 100 of FIG. 5 comprises a re-transmission control unit 101, a communication control unit 102, an application management unit 103, a re-transmission management unit 104, a data construction unit 105, a terminal state management unit 106, and a terminal performance judgement unit 107.

The re-transmission control unit 101 carries out the data communication according to a data transmission request from the application management unit 103, through the communication control unit 102. The transmission data are constructed at the data construction unit 105.

The re-transmission management unit 104 manages a packet receiving state (whether a packet of each (sequential) packet number is received at each terminal or not) for all the terminals 300 in a form of a re-transmission management table 1041 shown in FIG. 6. This re-transmission management table 1041 of FIG. 6 also contains the packet receiving state of the busy terminal as well. As shown in FIG. 6, the re-transmission management table 1041 indicates an already received packet by a symbol ○ and an unreceived packet by a symbol × in correspondence to a packet number and a terminal ID. In a practical implementation, a symbol ○ can be represented by a bit on state (1) and a symbol × can be represented by a bit off state (0).

The re-transmission management table 1041 is used for a management of a packet receiving state (whether a packet is received or not) at each terminal for the purpose of a packet re-transmission. This re-transmission management table 1041 can be shared among the normal terminals, the busy terminals, and the poor performance terminals. However, from a point of view of the processing efficiency, when the individual state management of each busy terminal or poor performance terminal is started, it is also possible to provide a separate table for each busy terminal or poor performance terminal by copying a line corresponding to that terminal in the re-transmission management table 1041, and manage the re-transmission state for that terminal separately according to this separate table. In this case, when the individual re-transmission with respect to each busy cancelled terminal or poor performance terminal is completed, the content of the separate table for that terminal can be copied back to the re-transmission management table 1041 so that the data re-transmission completion state of all the terminals can be comprehensible in the re-transmission management table 1041 again.

The terminal state management unit 106 stores and manages a state of each terminal as one of a normal communication state, a busy state, a busy cancelled state, and a poor performance state. The state of each terminal is recognized by analyzing a content of an acknowledge frame returned from each terminal through the communication network 200.

FIGS. 7A to 7D show contents of various communication frames used in this embodiment.

FIG. 7A shows an inquiry frame to be transmitted from the server 100 to the terminal 300, which comprises a destination terminal ID PO1, a source server address PO2, and a packet type POT. The source server address indicates an address of the server which is a source of this inquiry. The packet type POT indicates an integer value corresponding to a packet type of a inquiry data.

FIG. 7B shows a busy notification to be transmitted from the terminal 300 to the server 100, which comprises, a destination server address BO1, a source terminal ID BO2, and a packet type BOT. Here, the packet type BOT indicates an integer value corresponding to a type of a busy notification.

FIG. 7C shows a busy cancelled notification to be transmitted from the terminal 300 to the server 100, which comprises a destination server address 601, a source terminal ID 602, a packet type 60T, and an unreceived packet number sequence 603. Here, the packet type 60T indicates an integer value corresponding to a type of a busy cancelled notification. The unreceived packet number sequence 603 indicates a sequence of packet numbers for those packets which are not yet received by each terminal at a time of sending the busy cancellation notification. This unreceived packet number sequence 602 is usually identical to the unreceived packet number sequence contained in the negative acknowledge from the terminal and given in terms of numerical values, appropriate range symbols, etc.

FIG. 7D shows a poor performance notification to be transmitted from the server 100 to the terminal 300, which comprises a destination terminal ID DO1, a source server address DO2, a packet type DOT, and an additional information DO3. Here, the packet type DOT indicates an integer value corresponding to a type of a poor performance notification, The additional information DO3 is a supplementary information concerning an individual re-transmission timing, etc., by means which the terminal can learn about when the data re-transmission will be resumed so that the terminal can carry out a receiving preparation in advance.

The terminal performance judgement unit 107 judges whether the terminal 300 is in the poor performance state or not according to the acknowledge returned from the terminal 300. The terminal is judged as a poor performance terminal according to a data receiving state of the terminal indicated by the negative acknowledge (NACK) from the terminal or a number of times for which a time-out occurs while not receiving any acknowledge from the terminal. The judgement result is notified to the terminal state management unit 106. In a case of using a number of times for which a time-out occurs while not receiving any acknowledge from the terminal, the acknowledge from the terminal is urged by an inquiry packet, and when the time-out is repeated for over a prescribed number of times, the terminal is judged as a poor performance terminal.

Figure 8:
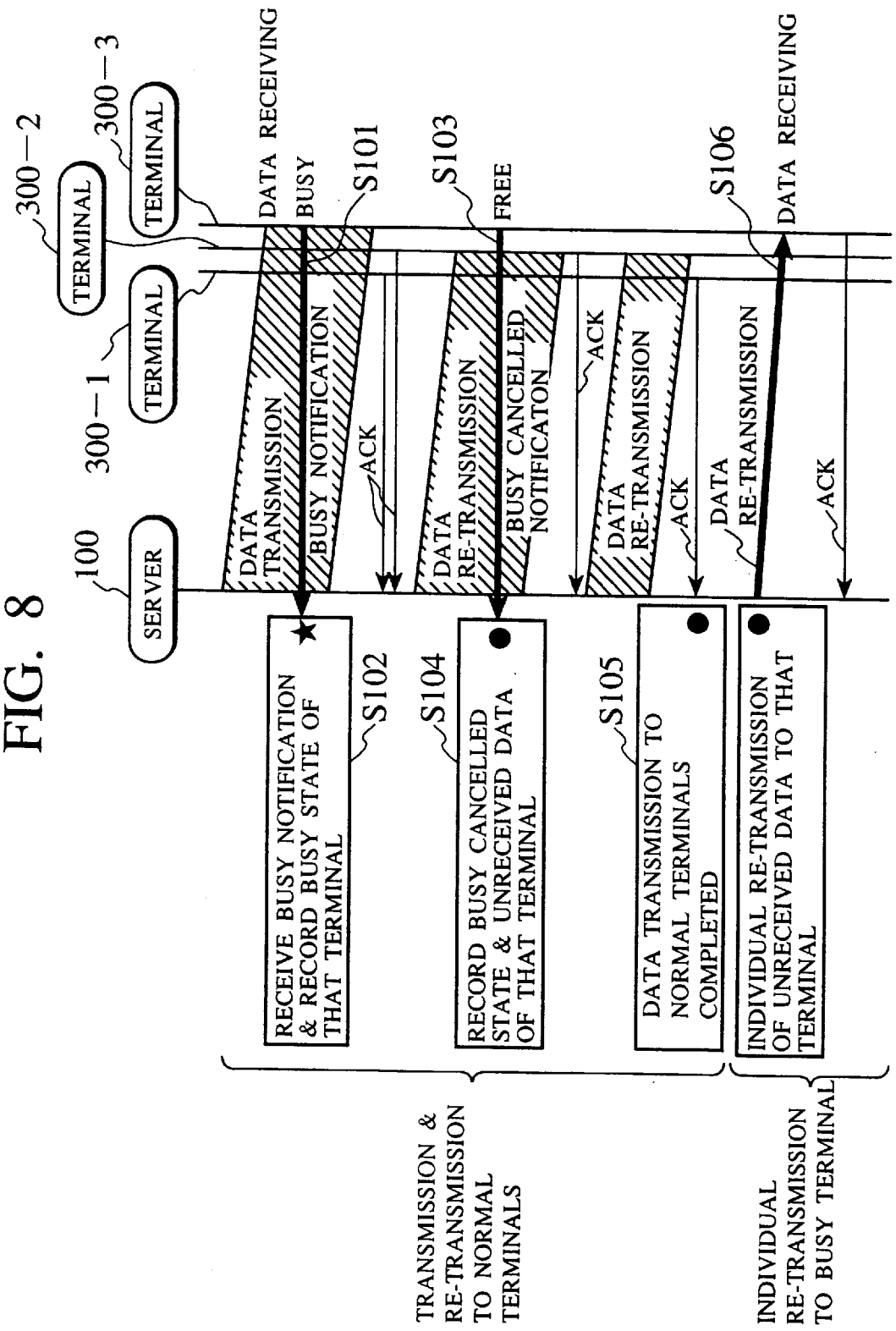
FIG. 8 is a sequence diagram showing a data re-transmission procedure in a case of handling a busy terminal in one embodiment of the present invention.

FIG. 8 shows a re-transmission sequence in a case where the terminal is judged as a busy terminal in this embodiment.

In FIG. 8, it is assumed that, at a time of the data transmission from the server 100, the terminal 300-3 is in a busy state while the terminals 300-1 and 300-2 are in normal states.

When the server 100 receives the busy notification from the terminal 300-3 during the data transmission (step S101), the server 100 records the fact that the terminal 300-3 is in a busy state at the terminal state management unit 106 (step S102). Thereafter, the server 100 manages the state of this terminal 300-3 separately from the normal terminals. Even after this recording of the busy state of the terminal 300-3, the server 100 continues the communication such as data transmission, re-transmission, acknowledge receiving, etc. with respect to the normal terminals 300-1 and 300-2.

Next, when the busy cancelled notification is received from the terminal 300-3 (step S103), the server 100 records the fact that the terminal 300-3 is in a busy cancelled state at the terminal state management unit 106 (step S104). At the same time, the unreceived packet number sequence contained in the busy cancelled notification is recorded into a re-transmission management table 1041 of the re-transmission management unit 104. Even after this recording of the busy cancelled state of the terminal 300-3, the server 100 continues the communication such as data transmission, re-transmission, acknowledge receiving, etc. with respect to the normal terminals 300-1 and 300-2.

When the data transmission with respect to the normal terminals 300-1 and 300-2 is completed (step S105), the server 100 carries out the re-transmission of the unreceived data with respect to the terminal 300-3 which is in busy cancelled state (step S106).

Figure 9:
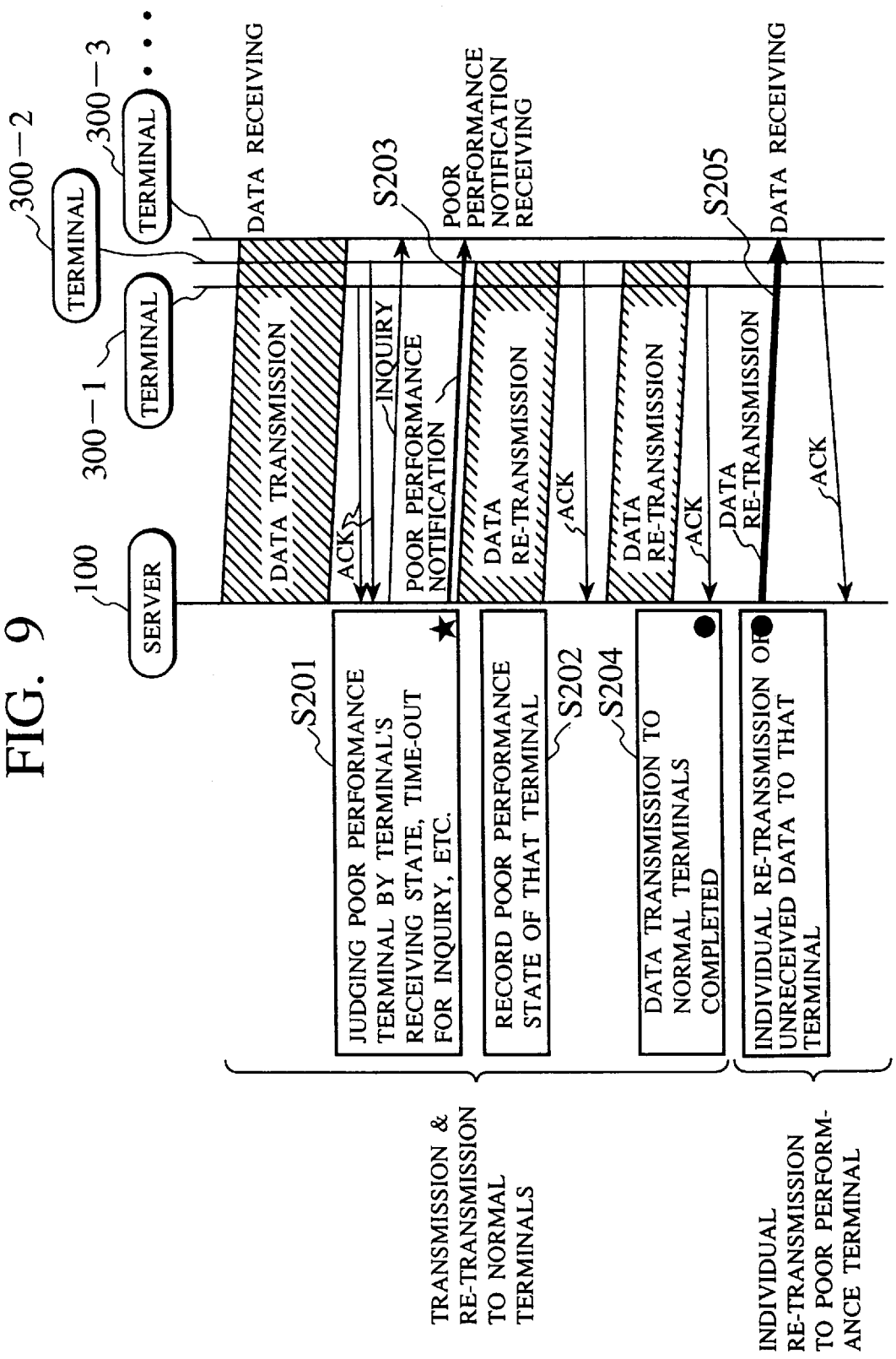
FIG. 9 is a sequence diagram showing a data re-transmission procedure in a case of handling a poor performance terminal in one embodiment of the present invention.

FIG. 9 shows a re-transmission sequence in a case where the terminal is judged as a poor performance terminal in this embodiment.

In FIG. 9, it is assumed that, in response to the data transmission from the server 100, the positive acknowledge is not received from the terminal 300-3, so that the server 100 judged this terminal 300-3 as a poor performance terminal according to a data receiving state at the terminal, a number of times for which a time-out occured after the inquiry, etc.

When the server 100 judges the terminal 300-3 as a poor performance terminal during the acknowledge receiving (step S201), the server 100 records the fact that the terminal 300-3 is in a poor performance state at the terminal state management unit 106 (step S202). At the same time, the unreceived packet number sequence contained in the negative acknowledge from the terminal 300-3 is recorded into the re-transmission management table 1041 of the re-transmission management unit 104. Here, if the negative acknowledge is also not received, all the packets are recorded as unreceived packets. In addition, the server 100 notifies the terminal 300-3 about the fact that it is in a poor performance state and the data transmission is interrupted, by means of the poor performance notification (step S203). Thereafter, the server 100 manages the state of this terminal 300-3 separately from the normal terminals. Even after this recording of the poor performance state of the terminal 300-3, the server 100 continues the communication such as data transmission, re-transmission, acknowledge receiving, etc. with respect to the normal terminals 300-1 and 300-2.

When the data transmission with respect to the normal terminals 300-1 and 300-2 is completed (step S204), the server 100 carries out the re-transmission of the unreceived data with respect to the terminal 300-3 which is in the poor performance state (step S205).

Figure 10B:
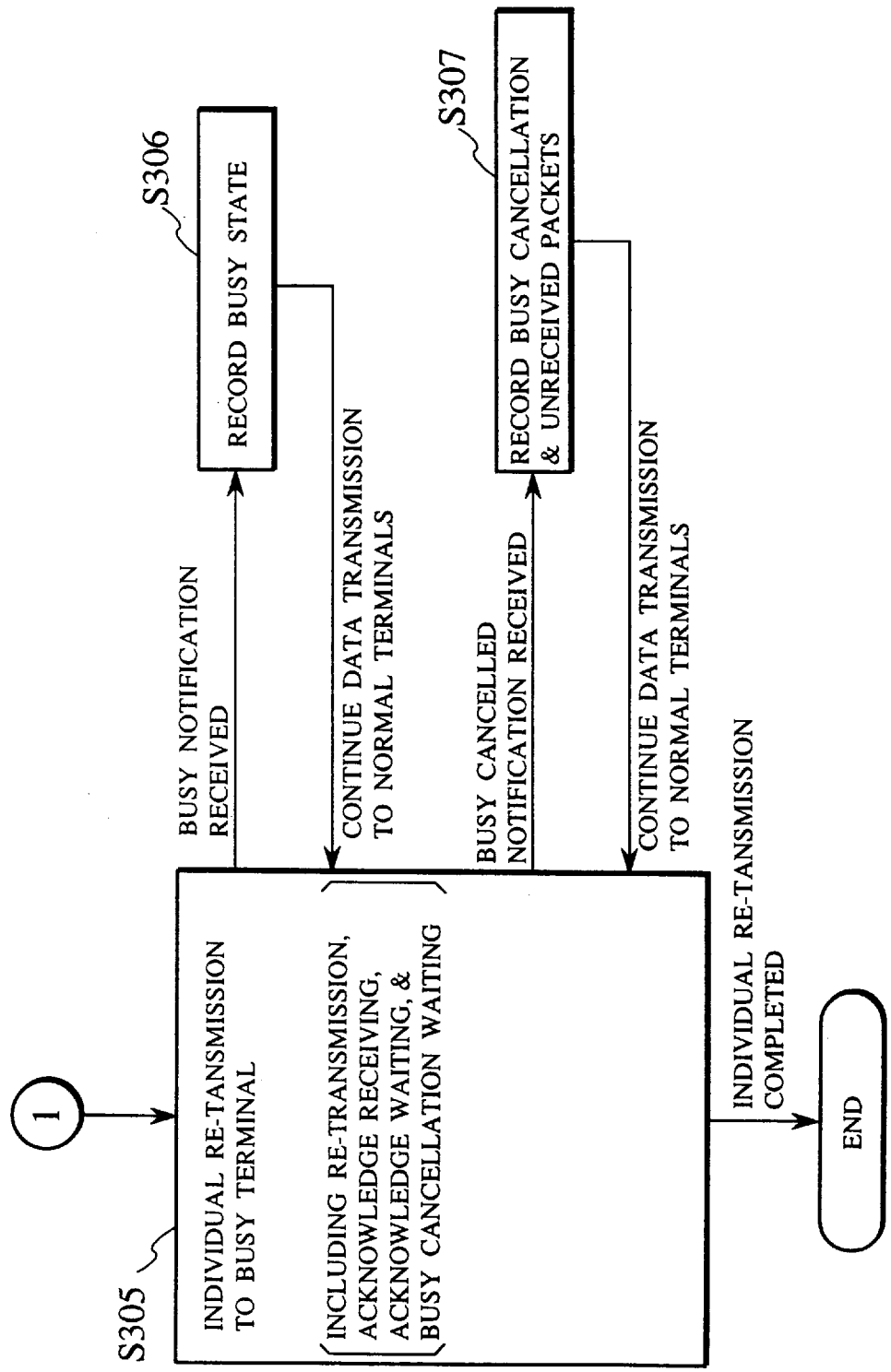
FIG. 10B is a flow chart for a processing of the server in a case of handling a busy terminal in one embodiment of the present invention.

FIG. 10 shows a flow chart for an exemplary data re-transmission procedure at the server 100 in this embodiment, for a case of handling a busy terminal.

At the step S301, when the re-transmission control unit 101 receives a data transmission request from the application management unit 103, the settings of the terminal state management unit 106 and the re-transmission management unit 104 are initialized for the purpose of the requested data transmission.

At the step S302, the data construction unit 105 constructs the first transmission data, divides it into packets and transfers the packets to the communication control unit 102. The communication control unit 102 starts the transmission of the transmission data in forms of packets to the normal terminals. Thereafter, the processing of this step S302 is continued until the data transmission (including transmission, re-transmission, acknowledge receiving and acknowledge waiting) with respect to the normal terminals is completed.

At the step S303, when the busy notification is received from one terminal during the data transmission processing, the terminal state management unit 106 records the busy state of this terminal, and manages the state of this busy terminal separately from the state of the normal terminals. The data transmission processing with respect to the normal terminals is then resumed immediately.

At the step S304, when the busy cancelled notification is received from one terminal, the server 100 records the busy cancelled state of this terminal at the terminal state management unit 106, while recording a state of the unreceived packets of this terminal at the re-transmission management unit 104 according to the unreceived packet number sequence contained in the busy cancelled notification.

There can be a case of receiving the busy notification again from a terminal which issued the busy cancelled notification once, and in such a case, the busy state of this terminal is recorded again at the step S303.

When the data transmission with respect to the normal terminals is completed, the processing of the next step S305 for the individual re-transmission with respect to the busy cancelled terminal is carried out.

At the step S305, the server 100 carries out the re-transmission of the unreceived packets with respect to the terminal from which the busy cancelled notification is received at the step S304, by referring to the re-transmission management table 1041.

Even during the individual re-transmission with respect to the busy cancelled terminal, it is still possible to receive a busy notification again from a terminal which issued the busy cancelled notification once, which can possibly be the terminal for which the re-transmission is currently carried out. In such a case, the busy state of this terminal is recorded again at the step S306.

Also, even during the individual re-transmission with respect to the busy cancelled terminal, it is still possible to receive a busy cancelled notification from a busy terminal. In such a case, at the step S307, the busy cancelled state of this terminal is recorded while a state of the unreceived packets for this terminal is recorded at the re-transmission management unit 104 according to the unreceived packet number sequence contained in the busy cancelled notification.

When the individual re-transmission with respect to the busy cancelled terminal is completed, the entire data transmission processing is finished.

Note that, when more than one busy terminals are involved, in a practical implementation, the individual re-transmission for each busy cancelled terminal can be carried out one by one, or the re-transmissions with respect to a plurality of busy cancelled terminals can be carried out in parallel.

FIG. 11 shows a flow chart for an exemplary data re-transmission procedure at the server 100 in this embodiment, for a case of handling a poor performance terminal.

At the step S501, when the re-transmission control unit 101 receives a data transmission request from the application management unit 103, the settings of the terminal state management unit 106 and the re-transmission management unit 104 are initialized for the purpose of the requested data transmission.

At the step S502, the data construction unit 105 constructs the first transmission data, divides it into packets and transfers the packets to the communication control unit 102. The communication control unit 102 starts the transmission of the transmission data in forms of packets to the normal terminals. Thereafter, the processing of this step S502 is continued until the data transmission (including transmission, re-transmission, acknowledge receiving and acknowledge waiting) with respect to the normal terminals is completed.

At the step S503, the server 100 awaits for an acknowledge from the terminal 300 in response to the data transmission, and when a negative acknowledge (NACK) is received from the terminal, the terminal performance judgement unit 107 obtains this negative acknowledge from the re-transmission control unit 101 and judges a data receiving state of the terminal which issued this negative acknowledge.

At the step S504, when the terminal which issued the negative acknowledge is judged as a poor performance terminal at the terminal performance judgement unit 107, the poor performance state of this terminal is recorded at the terminal state management unit 106, while the unreceived packets of this terminal are recorded at the re-transmission management unit 104. In addition, the fact that it is now handled as a poor performance state so that the re-transmission is postponed is notified to this terminal by the poor performance notification.

At the step S505, for each terminal to which the data transmission is carried out, n times (a prescribed number of times) for which the time-out by each terminal is permitted to occur consecutively is set up, and when a number of times for which the time-out by a terminal occurs consecutively exceeds this n times, this terminal is judged as a poor performance terminal. When a terminal is judged as a poor performance terminal at this step S505, the step S506 is carried out next, whereas otherwise the step S509 is carried out next.

At the step S506, whether an individual re-transmission is possible for a terminal which is judged as a poor performance terminal or not is judged. Here, the re-transmission management unit 104 refers to the re-transmission management table 1041, and when this terminal did not receive any packet at all, it is judged that the individual re-transmission for this terminal is not possible and the step S508 is carried out next. On the other hand, when this terminal received at least one packet (the re-transmission management table 1041 has a symbol 0 for at least one packet number), it is judged that the individual re-transmission for this terminal is possible and the step S507 is carried out next.

At the step S507, when it is judged that the individual re-transmission is possible at the step S506, the fact that the individual re-transmission due to a poor performance state is to be carried out for this terminal is recorded, while the fact that it is now handled as a poor performance packet is notified to this terminal by the poor performance notification.

At the step S508, when it is judged that the individual re-transmission is not possible at the step S506, this terminal is removed from the re-transmission target terminals by judging that it is useless to retransmit any more data to this terminal.

At the step S509, when a number of times for which the time-out by a terminal occurred consecutively is not exceeding the prescribed n times, an inquiry packet is sent to each terminal from which no acknowledge is received yet, so as to urge the acknowledge, and an acknowledge from each terminal is awaited.

At the step S510, when the data transmission with respect to the normal terminals is completed, the individual re-transmission with respect to the poor performance terminal is carried out.

Note that, when more than one poor performance terminals are involved, in a practical implementation, the individual re-transmission for each poor performance terminal can be carried out one by one, or the re-transmissions with respect to a plurality of poor performance terminals can be carried out in parallel.

It is to be noted that, although a case of handling a busy terminal shown in FIG. 10 and a case of handling a poor performance terminal shown in FIG. 12 are described separately in the above, it is also possible to combine these two cases. In such a case, there is an option regarding whether the individual re-transmission for a busy cancelled terminal is to be carried out before or after the individual re-transmission for a poor performance terminal.

For instance, it is possible to realize a practical implementation in which the individual re-transmission for a busy cancelled terminal is to be carried out first in principle, but the individual re-transmission for a poor performance terminal can be carried out first in a case of a busy cancelled notification waiting.

Thus, in this embodiment, the re-transmission to a terminal which became temporarily busy or a terminal with a poor data receiving state is separately handled at a later timing convenient for the server, and the transmission and re-transmission to the normal terminals which are majority among all the terminals are carried out at a higher priority.

As described, according to the data re-transmission management scheme of the present invention, a terminal state and a receiving state for a busy terminal and a poor performance terminal are recorded and managed separately from a state of normal terminals at the server, so that only the unreceived data can be re-transmitted to a busy cancelled terminal or a poor performance terminal, after the completion of the data transmission and re-transmission with respect to the normal terminals. Consequently, it is possible to prevent a wasteful re-transmission of already received data to a busy cancelled terminal or a poor performance terminal, while carrying out the data transmission and re-transmission with respect to the normal terminals at a higher priority, so that the communication efficiency for many terminals as a whole can be improved.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for a management of data re-transmission from a server to a plurality of terminals through a communication network, comprising the steps of:

(a) detecting any abnormal terminal including a busy terminal and/or a poor performance terminal among the plurality of terminals, and managing each abnormal terminal separately from other normal terminals, at the server;

(b) carrying out a management of data transmission and re-transmission from the server to the normal terminals; and (c) carrying out a management of a re-transmission of only unreceived data of each abnormal terminal from the server to each abnormal terminal, after a completion of the data transmission and re-transmission with respect to the normal terminals by the step (b).

2. The method of claim 1, wherein at the step (a) the server manages a data receiving state of the normal terminals according to a state management table, and separately manages a data receiving state of each abnormal terminal according to an individual state management table for each abnormal terminal.

3. The method of claim 2, wherein the server separates the individual state management table for each abnormal terminal from the state management table when each abnormal terminal is detected at the step (a).

4. The method of claim 2, wherein at the step (a) the data receiving state in the state management table indicates unreceived data of each normal terminal, and the server carries out a management of a re-transmission with respect to the normal terminals according to the state management table at the step (b).

5. The method of claim 2, wherein at the step (a) the data receiving state in the individual state management table indicates the unreceived data of each abnormal terminal, and the server carries out a management of a re-transmission with respect to each abnormal terminal according to the individual state management table at the step (c).

6. The method of claim 2, wherein at the step (a) the server detects a terminal from which a busy notification is received by the server as the busy terminal, and separately manages a data receiving state of the busy terminal by using a data receiving state of the busy terminal in the state management table at a time where the busy notification is received as a data receiving state of the busy terminal in the individual state management table.

7. The method of claim 2, wherein the server carries out a management of a re-transmission with respect to a busy cancelled terminal at the step (c) when a busy cancelled notification indicating a change of a busy terminal into a busy cancelled terminal is received by the server from a busy terminal detected at the step (a), by recording the unreceived data of the busy cancelled terminal indicated in the busy cancelled notification into the individual state management table for the busy cancelled terminal.

8. The method of claim 2, wherein at the step (a) the server starts a separate management of a data receiving state of the poor performance terminal according to the individual state management table for the poor performance terminal upon detecting a terminal from which a negative acknowledge indicating a poor data receiving state is received by the server as the poor performance terminal.

9. The method of claim 2, wherein at the step (a) the server starts a separate management of a data receiving state of the poor performance terminal according to the individual state management table for the poor performance terminal upon detecting a terminal for which a time-out is repeated for over a prescribed number of times while not receiving any acknowledge from said terminal as the poor performance terminal.

10. A server for carrying out a management of a data re-transmission to a plurality of terminals through a communication network, comprising:

management means for detecting any abnormal terminal including a busy terminal and/or a poor performance terminal among the plurality of terminals, and managing each abnormal terminal separately from other normal terminals; and transmission means for carrying out data transmission and re-transmission to the normal terminals, and a re-transmission of only unreceived data of each abnormal terminal to each abnormal terminal, under a control of the management means, after a completion of the data transmission and re-transmission with respect to the normal terminals.

11. The server of claim 10, wherein the management means manages a data receiving state of the normal terminals according to a state management table, and separately manages a data receiving state of each abnormal terminal according to an individual state management table for each abnormal terminal.

12. The server of claim 11, wherein the management means separates the individual state management table for each abnormal terminal from the state management table when each abnormal terminal is detected.

13. The server of claim 11, wherein the data receiving state in the state management table indicates unreceived data of each normal terminal, and the management means manages a re-transmission with respect to the normal terminals according to the state management table.

14. The server of claim 11, wherein the data receiving state in the individual state management table indicates the unreceived data of each abnormal terminal, and the management means manages a re-transmission with respect to each abnormal terminal according to the individual state management table.

15. The server of claim 11, wherein the management means detects a terminal from which a busy notification is received by the server as the busy terminal, and separately manages a data receiving state of the busy terminal by using a data receiving state of the busy terminal in the state management table at a time where the busy notification is received as a data receiving state of the busy terminal in the individual state management table.

16. The server of claim 11, wherein the management means manages a re-transmission with respect to a busy cancelled terminal when a busy cancelled notification indicating a change of a busy terminal into a busy cancelled terminal is received by the server from a busy terminal detected by the management means, by recording the unreceived data of the busy cancelled terminal indicated in the busy cancelled notification into the individual state management table for the busy cancelled terminal.

17. The server of claim 11, wherein the management means starts a separate management of a data receiving state of the poor performance terminal according to the individual state management table for the poor performance terminal upon detecting a terminal from which a negative acknowledge indicating a poor data receiving state is received by the server as the poor performance terminal.

18. The server of claim 11, wherein the management means starts a separate management of a data receiving state of the poor performance terminal according to the individual state management table for the poor performance terminal upon detecting a terminal for which a time-out is repeated for over a prescribed number of times while not receiving any acknowledge from said terminal as the poor performance terminal.

* * * * *